United States Patent [19]
Jeffras et al.

[11] 4,140,954
[45] Feb. 20, 1979

[54] CURVATURE CONTROL

[75] Inventors: Nathaniel B. Jeffras, Woodland Hills; Douglas K. Kapin, Reseda, both of Calif.

[73] Assignee: Automation Industries, Inc., Los Angeles, Calif.

[21] Appl. No.: 766,688

[22] Filed: Feb. 8, 1977

[51] Int. Cl.² ............................................. G05B 19/18
[52] U.S. Cl. .................................. 318/569; 318/567; 73/619; 318/568
[58] Field of Search ............... 318/567, 568, 569, 570, 318/162, 627; 364/721, 729, 730; 73/622, 621, 640, 634, 633, 620, 619

[56] References Cited

U.S. PATENT DOCUMENTS

| | | | |
|---|---|---|---|
| 3,813,528 | 4/1974 | Blanding | 364/721 |
| 3,898,838 | 8/1975 | Connelly | 318/568 |
| 3,983,374 | 9/1976 | Sorensen et al. | 73/619 |

Primary Examiner—Robert K. Schaefer
Assistant Examiner—M. K. Mutter

Attorney, Agent, or Firm—Anthony W. Karambelas

[57] ABSTRACT

Herein described is an electronic control system for guiding a search unit of a nondestructive material tester over sloped or curved surfaces and shapes. More particularly described is the index system used on an indexing-scanning (inspection) device. An oscillator provides a preset number of pulses through an angle rate generator and direction logic to a binary coded decimal pulse counter. The counter keeps track of the input pulses provided thereto (each pulse represents an 0.1° increment) therefore, its contents are indicative of the angle accumulated therein. A pair of read only memories provides the sine function and cosine function of the accumulated angle as a binary coded decimal trigonometric representation of the input angular degree. The signals therefrom control respective Y and Z rate generators whose input clock rate is indicative of the velocity along the curve of the pivot point of the search unit. Signals from the Y, Z and angle rate generators are provided to their respective translators which in turn control the Y, Z and gimbal motors.

4 Claims, 13 Drawing Figures

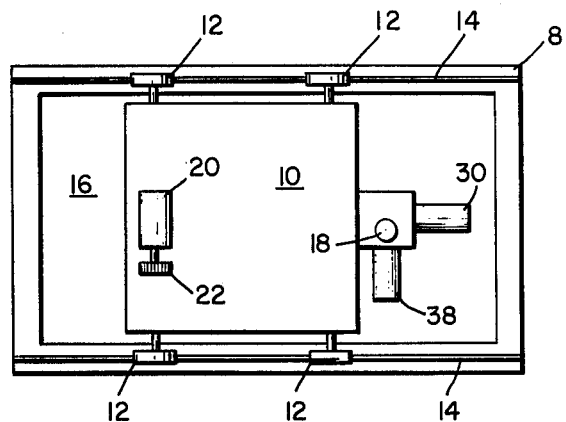
Fig. 1A.
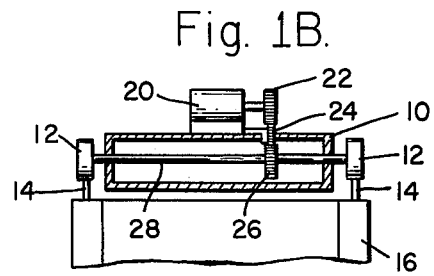
Fig. 1B.
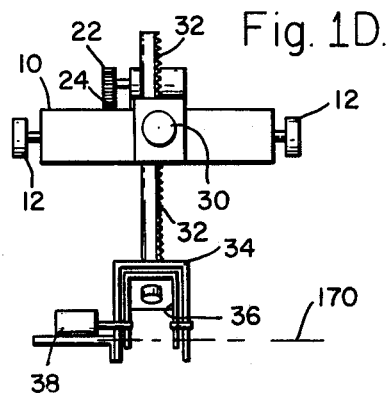
Fig. 1D.
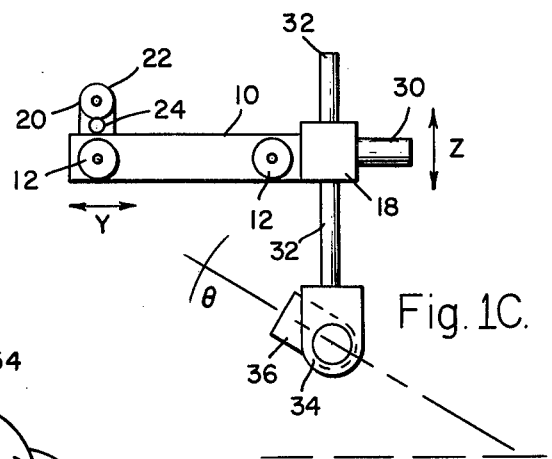
Fig. 1C.
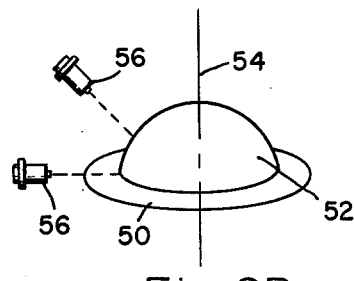
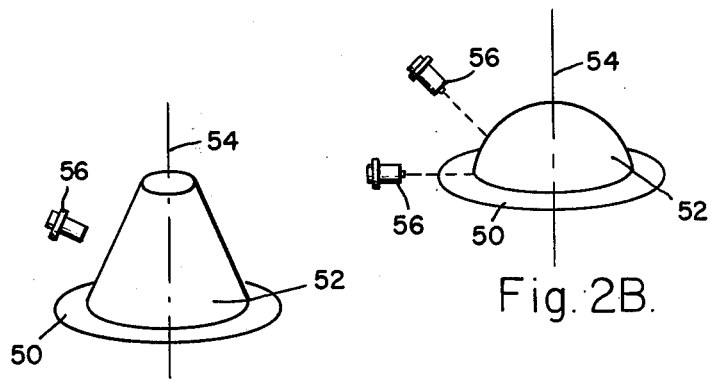
Fig. 2A.
Fig. 2B.
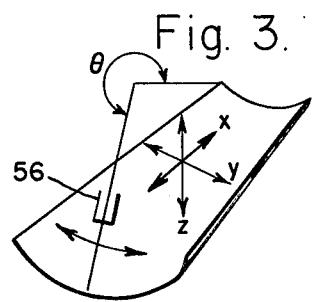
Fig. 3.
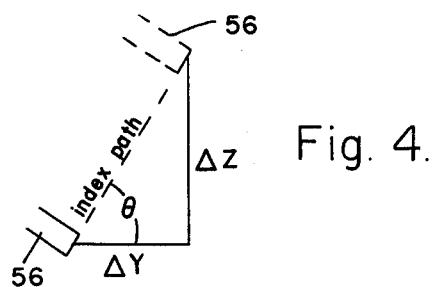
Fig. 4.

FIG. 7 Table I.

| INPUT | | OUTPUT | |
|---|---|---|---|
| Angle | Normal/W.P. | Quadrant | Angle |
| 0°–90° | Normal | I | 0°–90° |
| 0°–90° | Water Path | I | 90°–0° |
| 90°–180° | Normal | II | 90°–0° |
| 90°–180° | Water Path | II | 0°–90° |
| 180°–270° | Normal | III | 0°–90° |
| 180°–270° | Water Path | III | 90°–0° |
| 270°–360° | Normal | IV | 90°–0° |
| 270°–360° | Water Path | IV | 0°–90° |

FIG. 8 Table II.

| INPUT | | | OUTPUT | |
|---|---|---|---|---|
| Part Radius | Pivot-to-Part | Curve Inside/Outside | Radius > Pivot Part | Fwd/Rev | Pivot Point Radius (PPR) |
| XXX.XX | XX.XX | Outside | Radius > PP | Fwd | Rad. + PP |
| | | Outside | Radius < PP | Fwd | Rad. + PP |
| | | Inside | Radius > PP | Fwd | Rad. – PP |
| | | Inside | Radius < PP | Rev | Rad. – PP |

FIG. 9 Table III.

| INPUT | | | OUTPUT | | |
|---|---|---|---|---|---|
| Fwd/Rev | Quadrant | CW CCW | Direction Y | Z |
| FWD | I | CW | + | + |
| FWD | I | CCW | – | – |
| FWD | II | CW | + | – |
| FWD | II | CCW | – | + |
| FWD | III | CW | – | – |
| FWD | III | CCW | + | + |
| FWD | IV | CW | – | + |
| FWD | IV | CCW | + | – |
| REV | I | CW | – | + |
| REV | I | CCW | + | + |
| REV | II | CW | – | – |
| REV | II | CCW | + | + |
| REV | III | CW | + | – |
| REV | III | CCW | – | + |
| REV | IV | CW | + | – |
| REV | IV | CCW | – | + |

CURVATURE CONTROL

BACKGROUND OF THE INVENTION

This invention relates to material testers and more particularly to a novel and improved system for directing a search unit of an ultrasonic nondestructive material tester, for example, over curved or sloped surfaces or the like.

Presently it is conventional to inspect a workpiece for flaws or defects contained therein by ultrasonic nondestructive testing methods. These methods include an ultrasonic transducer such as a piezoelectric crystal which when energized by an electrical stimulous radiates a beam of ultrasonic energy into a workpiece. If the familiar pulse echo search unit is used, the ultrasonic energy is reflected back from a defect within the workpiece to the crystal whereby the mechanical vibrations thereof are translated back into electrical signals. In this method the time of arrival of the return signal indicates the presence and the exact location of the defects within the workpiece. On the other hand, when the familiar "through" transmission system is used a separate transducer is aligned opposite the workpiece and attenuations due to the defect in the workpiece or change in the time of arrival of the signal is indicative of some characteristics of the workpiece.

It has been found in ultrasonic systems that the pulse/echo system is generally suited for large workpieces whereby the search unit must scan the workpiece to make sure that the entire area of the workpiece is inspected for defects. Normally alternate scans and indexes are made over the workpiece surface. On the other hand, if conical, frusto-conical, hemispheric or other such shaped workpieces are used, they are affixed to a rotating table and an indexing search unit is used whereby the index motion occurs after each complete revolution of the turntable.

As is well known to those skilled in the art, ultrasonic energy is greatly attenuated in air; thus it is oftentimes necessary to immerse the workpiece and the search unit into a couplant material, such as water, so that good ultrasonic coupling is possible. Thus it is necessary on large workpieces, for example, to have a large test tank filled with water or other suitable couplant. The search unit is then scanned relative to the workpiece while both are immersed in the couplant fluid in the test tank.

In normal operation it is found that when inspecting flat workpieces a search unit only needs to be operated along the horizontal (X and Y) axes of the workpiece. But difficulty exists when the workpiece may be of an irregular shape. For example, the workpiece may have sloped or curved surfaces. In order to compensate for the irregular shape such as the slopes and curves hereinafter mentioned, a vertical (Z) axis and sometimes a gimbal ($\theta$) axis of movement is necessary for the search unit. Not only must the search unit move in the X and Y axes but also sometimes in the vertical (Z) and gimbal ($\theta$) axis. As an example, a scan is only made in a single direction (X) but indexing may be necessary in two other axes (Y and Z) to advance the search unit parallel to the curved or sloped surface while gimballing ($\theta$) may be simultaneously necessary to correct the search unit attitude with respect to the part surface.

Heretofore such devices capable of causing the three axis motion has included very complicated electrical tape program reading systems and digital and/or analog computers for deriving the voltage to change the positions of the index axes (Y and Z) and gimbal ($\theta$) axis. As can be seen, such tape control devices in computers for performing such functions are quite expensive. Thus, in most cases, programmed indexing and gimballing has been performed manually. While of course this later operation is less expensive, it is undesirable to provide an operator for continuously indexing or moving the position of the search unit for each scan of the search unit.

An example of the type of workpieces which are difficult to scan during ultrasonic testing are sloped workpieces. On these workpieces, a simultaneous position change between the Y and Z axes is necessary during the indexing so that the angle of the hypotenuse between adjacent sets of Y and Z axes coordinates remains fixed. Another type of workpiece, which is difficult to inspect, is a curved workpiece such as a convex or concave surface, for example, a hemispherically shaped dome, whereby the angle of the hypotenuse continually changes thereby describing a curved indexing path.

It is, therefore, extremely desirous of providing an electrical control system which can control the axis position of a three dimensional object so as to perform the defect search maneuvers on these workpieces which have heretofore been difficult to scan.

A system which performs similar functions and illustrates some of the mechanical mechanisms used in conjuction with the present invention is shown in U.S. Pat. No. 3,721,118 assigned to Automation Industries, Inc., the assignee of this invention. The similarities in these mechanica portions of this invention are adequately described in the prior patent and will not be described in detail herein.

SUMMARY OF THE DESCRIPTION

Because the path that the search unit follows is parallel to the surface of the part being inspected, all constant radius curves may be paralleled by other constant radius curves or by smaller radius curves. One of the functions of the present invention is to orderly control a size (radius) of the circular path that the search unit path describes while controlling the gimbel attitude of search unit during its progression on the path. Thus an oscillator is preset to emit a certain number of pulses when activated which modifys the value of the initial program angle (0° to 359.9° in 0.1° increments.) The program angle is the angle that the circuits of the present invention compute.

The premise of the control described herein is based on the trigonometric fact that the circumference of a circle, is equal to $2\pi$ radians and that the circumference of a given circle may be represented by a finite number (N) of straight line elements whereby each straight line element has a progressive slope.

Search unit motion is controlled parallel to the tangent of the program angle by oscillator control circuits which permit a specific number of pulses which relates to this position. These pulses are fed directly into a rate generator which provides one pulse out for each 1,745 pulses in. The remaining pulses are then accumulated in a counter until it reaches a 1,745 count again.

This 1,745 count is computed as the number of 0.001" increments that occur on the circumference of a 1000" radiused circle between 0.1° angularly displaced rays, as noted:

$$\text{Count} = \frac{\text{Circumferential Steps}}{N \text{ Angular Increments}}$$

$$= \frac{2\pi \ 1000'' \cdot 1000 \text{ steps/in.}}{3600 \text{ Angular Increments}}$$

$$= 1,745 \text{ Steps/Angular Increments}$$

Each output pulse from the rate generator causes a step advance of the gimbal ($\theta$) axis of 0.1°.

The output of the counter is provided into sine and cosine read only memories (ROM's) which provide the respective BCD trigonometric functions. Each of the sine/cosine ROM's has an output which is provided into respective rate generators which multiply the clock pulse by their repective trigonometric functions. The output from the sine ROM is fed into a Y axis rate generator where the binary coded decimal trigonometric sine function is multiplied by the clock pulses. Similarly, the cosine ROM controls a Z axis rate generator. The respective output pulses are then provided into Y and Z translators which control signals to the Y axis motor and the Z axis motor.

DESCRIPTION OF THE DRAWINGS

These and other features and advantages will become more apparent to those skilled in the art when taken into consideration with the following detailed description wherein like reference numerals indicate like or corresponding parts throughout the several views and wherein:

FIGS. 1A through 1D specifically illustrate one embodiment of a bridge and carriage arrangement which are used to perform nondestructive testing of a workpiece;

FIG. 2A illustrates a typical workpiece which has an inclined surface which can be inspected by operating the control system in accordance with the shown embodiment of the present invention;

FIG. 2B illustrates a curved workpiece which can effectively be scanned by a search unit control system in accordance with the shown embodiment of the present invention.

FIG. 3 illustrates a convex workpiece which can effectively be scanned by a search unit control system in accordance with one embodiment of this invention;

FIG. 4 is a graphic illustration indicating the angular index path which uses sine/cosine derived coordinates of the embodiment shown in FIG. 5;

FIGS. 7-9 represent logic functions for the circuit of FIG. 5.

DESCRIPTION OF THE SHOWN EMBODIMENT

Figure 5:
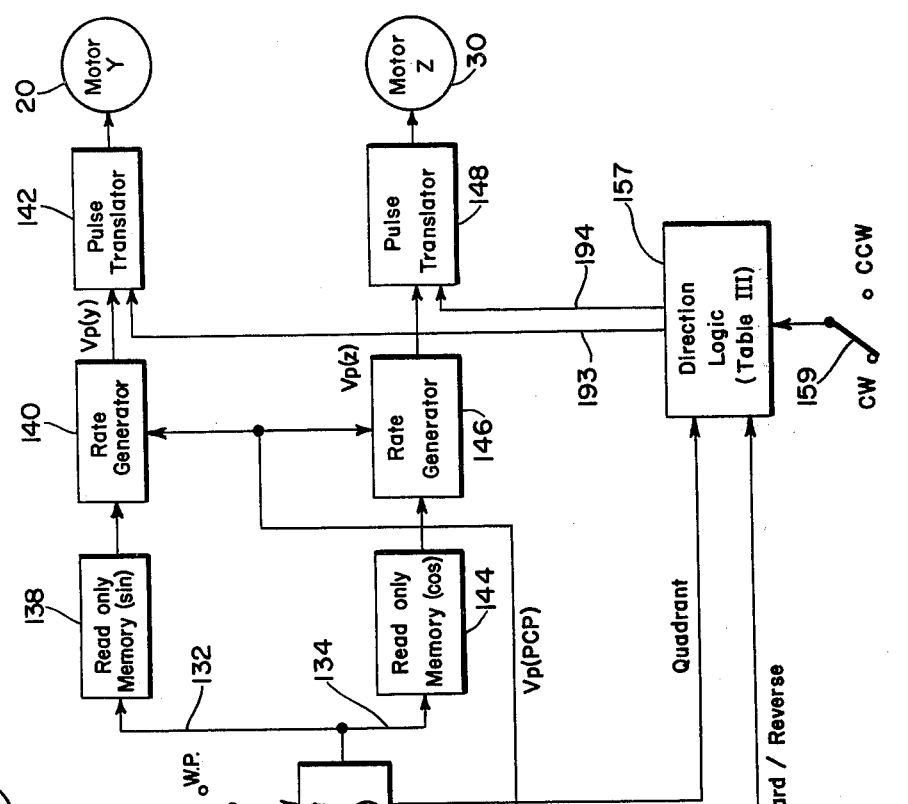
FIG. 5 illustrates a block diagram of a control system in accordance with the shown embodiment described in connection with FIG. 5 and, FIG. 6 is a diagram showing pivot part and part radii from a curved workpiece.
Figure 6:
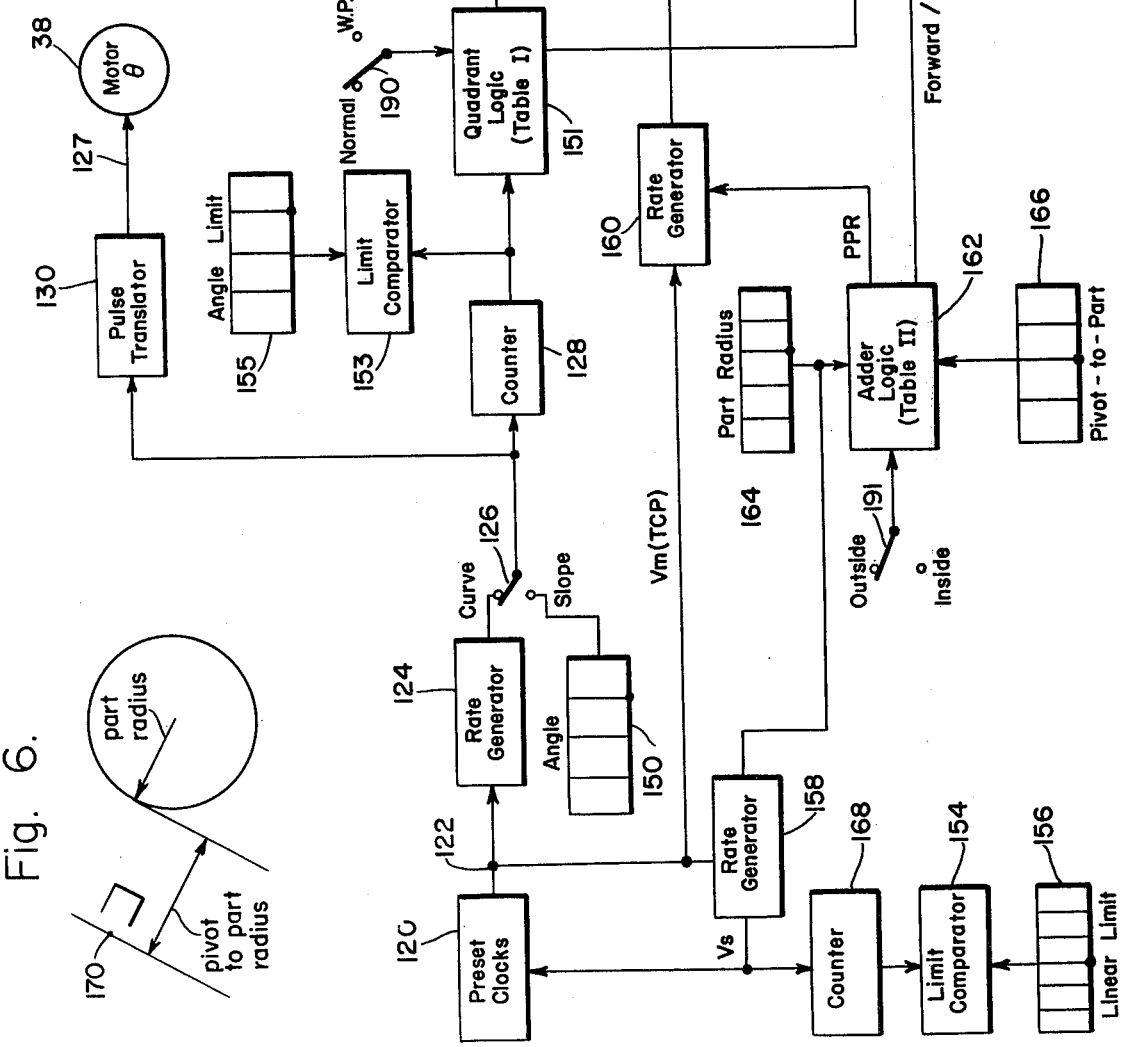

FIG. 1A is a top view of a test tank 8 having a bridge 10 which includes four roller 12 positionable on rails 14 on the side of test tank 8. Test tank 8 may be filled with a suitable liquid couplant 16 such as water. The bridge 10 spans across the tank 8 and has a carriage 18 mounted thereon to carry a search unit (not shown) for performing nondestructive ultrasonic testing. A motor 20 which may be a stepper motor is mounted on top of the bridge 10 includes a pulley 22 thereon, which is coupled by appropriate means such as gearing or timing belt or the like 24 onto a pulley or gear 26 which is affixed to an axle 28 for driving the rear wheels 12 of bridge 10.

As the motor 20 receives an electrical energy from a source, hereinafter to be described, bridge 10 is moved an increment of travel along the longitudinal axis of the test tank 8. The increments are in predetermined distances which are governed by the pulse of the source. A motor 30, which may also be effectively a stepper motor, is mounted to the carriage 18 which moves the search unit in a vertical motion. Effectively, the carriage 18 includes therein a rack and pinion arrangement which moves shaft 32 in a vertical motion. The shaft 32 extends into the tank 8 and includes a bracket 34 which is adapted to hold the search unit heretofore mentioned (not shown). The bracket 34 and is movable by a gimbal motor 38 which may also be a stepper motor. Motor 38 is used to position the angle of the transducer search unit in relation normal to the test surface of the workpiece being tested. Specifically, those workpices shown in FIG. 2A, 2B and 3, hereinafter described. Therefore, when electrical pulses are applied to the motor 30 and the motor 20 simultaneously the search unit moves on an inclined plane. The slope of the search unit is controlled by the motor 38 which sets it normal to the surface of the workpiece being scanned for defects.

The workpiece itself is mounted within the test tank 8 and is either rotated by a turntable for a scan relationship with a search unit 56 described by FIG. 2A or FIG. 2B or is scanned by a reciprocating search unit 56 as described by FIG. 3. After each complete scan of the workpiece, an index command is generated which causes the search unit to be indexed an increment dictated by the circuitry hereinafter to be described and the scan is made of the workpiece a second time across a different scan line.

With reference now to FIG. 2A there is shown a support in the form of a turntable 50 which has a workpiece 52 positioned thereon wherein the turntable 50 is rotated about the Z axis 54. The search unit 56 which includes a piezoelectric crystal transducer for performing a search function, is angularly disposed normal to the surface of the workpiece 52. It should be understood that the search unit 56 is coupled to the mechanical gearing apparatus which moves along the Y and Z axes in a manner heretofore described in connection with FIGS. 1A through 1D. The search unit 56, workpiece 52, and turntable 50 are placed within the couplant in the test tank.

With reference now to FIG. 2B it an be seen that the search unit 56 is positioned near the workpiece 52 which in this particular case happens to be a convex surface and is mounted on a rotating turntable 50. In this case not only must index movement in the Y and Z axis be provided, but also the search unit 56 must be gimballed so that the search unit axis remains perpendicular to the said movement. The same is true with the system shown in FIG. 3 except, of course, scanning motion is by the search unit rather than as a result of the turntable rotation.

The graph in FIG. 4 shows relative movement necessary along the Z and Y axes to provide the change in the search unit 56 positioned along the inclined slope set forth therein as the index path. The system set forth hereinafter operates in accordance with the equations:

$Y = H \sin \theta$ $Z = H \cos \theta$

Where H is the vector motion of the search unit and
Y and Z are the changes in respective coordinates.

Referring now to FIG. 5 there is shown an oscillator 120 which is gated by circuit 122 into rate generator 124. The gated circuit 122 is controlled by the preset indexer 120 to provide, in effect, preset index pulses which will be described in more detail.

Such rate generators are well known to those skilled in the art and can be easily purchased off the shelf from many manufacturers.

In some instances, these rate generators are referred to as Synchronous Decade Rate Multipliers types SN 54167, SN 74167, manufactured by Texas Instruments Incorporated, Dallas, Texas, 75222 and explained in their Bulletin No. DLS 7211813, December, 1972.

The rate generator is, in effect, a counter which, when enabled, the output frequency is equal to the input frequency multiplied by the rate input M, that is, $f_{out} = M \cdot f_n$ where M = the ratio:

$$\frac{3600 \text{ increments}}{2\pi \cdot 1000 \text{ in.} \cdot 1000 \text{ pulses/in}} =$$

1 increment out for each 1,745 increments in.

The output of the rate generator 124 is connected by the switch 126 into a counter 128. The output circuit from rate generator 124 also provides a clock pulse which is hereinafter used in further circuitry. The output of the rate generator 124 is also coupled into a translator 130 which has in turn an output circuit 127 into the gimbal motor 38.

The pulses from the gate circuit 122 provides a plurality of preset output signals to the rate generator 124 which is effective to provide one pulse output for each 1,745 pulses provided in. This is computed in the manner heretofore described and based on a 1000.000 inch radius which, in turn, equals $2\pi$ 1000.000 inch circumference. Therefore, 1,745 pulses per angular step is provided figuring on a ratio of 6,280,000 surface increments for each 3600 angular increments or a total of 3600 angular steps per circumference. It will be described hereinafter that the settings are changed for workpieces of radii less than 1000".

An output from the rate generator 124 is coupled through circuit 126 to a counter 128. Counter 128 is, in effect, a counter which provides a binary coded decimal output indicative of the accumulated input pulses and addresses a quadrature logic circuit 151 which translates the angular value of 0° – 359.9° into an angle whose value is between 0° and 90°. An orthogonal Normal-Water Path switch 190 is also input to the quadrature circuit 151 for determination of the output value. Table 1 describes the quadrant logic circuit 151 functions. The output circuits 132 and 134 are coupled through circuitry, hereinafter described, to the stepper motor 20, which, in turn, provides vertical axis movement.

The output circuits 132 are coupled into a sine read only memory 138, hereinafter referred to as ROM 138, to provide a binary coded decimal angular address input. The outputs therefrom are further binary coded decimal but are indicative of the sine trigonemetric function of the angle into the ROM 138.

These binary coded decimal sine functions, indicative of the search unit motion perpendicular to the angular address during a Normal operating mode or radially in the direction of the angular address as selected by the orthogonal (Water Path) swith 190, when in a Water Path operating mode, are applied directly from ROM 138 into a rate generator 140 which multiplies the clock pulses from circuit 160, hereinafter described, by the sine of the angle.

The output from the rate generator 140 provides uniform pulses indicative of the multiplied rate signal to a translator 142 which, in turn, provides stepping pulses to the stepper motor 30 to move the search unit in its vertical axis at a predetermined velocity.

Again, the output circuit 134 from the counter 128 is coupled into cosine read only memory 144 hereinafter referred to as ROM 144. The output from ROM 144 is connected to the rate generator 146 for the said perpendicular or radial control of the search unit assembly as selected by the orthogonal (Water Path) switch 190.

The output of ROM 144 is a binary coded decimal signal indicative of the cosine trigonemetric function and is applied to the rate generator 146. The output of the rate generator multiplies the clock signal from circuit 160, hereinafter described, and provides the signals into translator 148, which provides stepping pulses to the motor 30 which moves the search unit in the vertical Z axis. Translators 142 and 148 cause the Y and Z axis motors 20 and 30 respectively to move 0.001 inch per input pulse.

If it is desirous to operate this circuit only in a preset angle, signals are supplied from the Preset Angle circuit 150 to the counter 128 where the signals remain present at all times.

So far the explanation has been set forth regarding a 1000" inch radiused workpiece. Of course, inspection is performed on workpieces of all lesser radii. These changes are made by changing the input of the clock pulse rate generator 140 and rate generator 146. The output from circuit 122 is referred to herein, as total clock pulses (TCP), and are reduced in number by a rate generator 160.

Now, in order to operate the present invention over a radii less than 1000" the clock pulses from preset indexer oscillator circuit 122 are reduced in frequency by a rate generator 160 depending upon the desired part radius and inspection search unit geometry (Pivot-To-Part distance). The clock pulses are reduced by the ratio equal to $$\frac{\text{Pivot Radius (Inches)}}{1000.000 \text{ Inches}}$$

where the Pivot Radius is equal to the absolute value of the Part Raduis + Pivot-To-Part Distance, where the Part Radius is positive for outside curves and negative for inside curves and the Pivot-To-Part distance is always positive.

The value of the pivot rate, with respect to the surface at 1000 inch radius, is made by the output of a digital adder/subtractor 162 as shown in FIG. 5, which derives inputs from a pair of binary coded switches 164 and 166 sometimes referred to as thumbwheel switches, such thumbwheel switches are well known to those skilled in the art and are manually set to certain numbers as indicated and supply binary coded decimal outputs indicative of the settings. These BCD signals from thumbwheel switches 164 and 166 are applied to the adder 162 in conjunction with the Outside-Inside switch 191, to provide an absolute value of the algebraic sum. The sum therefrom is applied to rate generator 160. The output of the rate generator, referred to herein as the pivot clock pulse (PCP) and which is indicative of the velocity of the manipulator pivot axis, is applied to rate generators 140 and 146.

Thumbwheel switch 164 is set to the radius of the arc of the workpiece being inspected being referred to as Part Radius. Thumbwheel switch 166 is set to the distance between the surface of the part to the pivot point (Pivot-To-Part) 170 of the search unit. The Outside-Inside switch 191 is set to the desired contouring mode. The algebraic sum, as described by Table II, then controls rate generator 160. Thus, signals from rate generators 142 and 148 are indicative of the velocities of the X and Y axes where:

$$V_m = \frac{1,745}{10,000} = \text{Master clock (representing the surface velocity at a 1000" radius)}$$

$$V \text{ pivot} = \frac{1,745}{10,000} \times M = \text{Pivot clock (representing the velocity of the pivot axis)}$$
$$\text{where } M = \frac{\text{pivot radius}}{1000 \text{ in part radius}}$$

$$V \text{ pivot}_Y = V \text{ pivot} \times M_1 = \text{Pivot clock (representing the horizontal velocity of the pivot axis)}$$
$$\text{where } M_1 = \sin \theta$$

$$V \text{ pivot}_2 = V \text{ pivot} \times M_2 = \text{Pivot clock (representing the vertical velocity of the pivot axis)}$$
$$\text{where } M_2 = \cos \theta$$

The pivot velocity ($V_P$) is maitained at a value less than 200 CPS to assure that the response ability of stepper motors 20 and 30 is not exceeded.

Additional clock pulse signals are required to be indicative of the surface position of the part whereby these signals are used to control the preset indexer 120 for the precise incremental advance of a sound beam along the part surface where:

$$V \text{ surface} = \frac{1,745}{10,000} \times M_3 = \text{Surface clock (representing the part surface velocity)}$$

$$\text{where } M_3 = \frac{\text{Part Radius}}{1000" \text{ Part Radius}}$$

The clock pulses from rate generator 158 are indicative of the sound beam advancement along the part surface and are, therefore, used to precisely feed-back control the preset indexer.

Quadrature circuit 151 provides, in conjunction with the radius adder 162 and preset Panel Direction switch 159, signals into the direction logic circuit 157. Output circuit 193 controls the run direction of translator 142, which, in turn, controls the longitudinal motor direction and circuit 194 controls the direction of translator 143 and vertical motor 30. Truth Table III defines the direction circuit 157 logic functions.

Counters for the accumulation of the rate generator outputs 124 (counter 128) and 158 (counter 168) provide BCD values indicative of the function position. BCD thumbwheel controlled comparators 153 and 154 are included to provide limits for the selected counter values.

Having thus described the embodiment of the invention, what is claimed is:

1. A scanning system including:
   means for generating predetermined output pulses indicative of a predetermined circumferential value,
   means for converting said pulses to predetermined angular increments,
   means responsive to said converting means for accumulating said pulses to an address code indicative of said angular positions,
   means for storing sine/cosine functions indicative of said angular positions and providing read out signals indicative of said trignometric functions when addressed by said address code, and means for uniformly incrementing the sound beam along the actual part surface.

2. The scanning system as defined in claim 1 further including:
   means to limit control operation to predetermined linear boundaries.

3. The scanning system as defined in claim 2 further including:
   means to limit control operation to within predetermined angular boundaries.

4. The scanning system as defined in claim 3 wherein said storage means comprising first read only memory for storing sine functions indicative of certain angular positions and providing output signals indicative thereof when addressed by said address, and
   a second read only memory for storing cosine functions indicative of certain angular positions and providing output signals indicative thereof when addressed by said address.

* * * * *